Dec. 5, 1967

S. WAY 3,356,870

CONTINUOUS REHEAT MAGNETOHYDRODYNAMIC
GENERATING DUCT ARRANGEMENT
Filed Nov. 27, 1963

INVENTOR
Stewart Way
BY
ATTORNEY

United States Patent Office 3,356,870
Patented Dec. 5, 1967

3,356,870
CONTINUOUS REHEAT MAGNETOHY-
DRODYNAMIC GENERATING DUCT
ARRANGEMENT
Stewart Way, Churchill, Pittsburgh, Pa., assignor to Westinghouse Electric Corporation, Pittsburgh, Pa., a corporation of Pennsylvania
Filed Nov. 27, 1963, Ser. No. 326,612
5 Claims. (Cl. 310—11)

The present invention relates to magnetohydrodynamic generating systems and more particularly to continuous reheat generating duct arrangements therefor.

According to magnetohydrodynamic (hereinafter referred to as MHD) theory, an electric voltage is generated between electrodes on spaced walls of a duct along which a conductive fluid or ionized gas is transported and in which a magnetic field is established transversely of both the interelectrode direction and the flow direction of the fluid. This theory is a special case of the more general electromagnetic induction theory of Faraday according to which an electromotive force or voltage is induced in an electric circuit whenever the magnetic flux linking the circuit changes. As is well known in electromechanical machines, the Faraday theory accounts for voltage generation in copper or other solid conductors with which flux linkages continually undergo change by movement of the conductors through a magnetic flux field or by movement of a magnetic flux field across the conductors.

In an MHD system, a flowing conductive fluid or ionized gas is given the role of a conductor or conducting medium undergoing motion through a magnetic flux field, and an electric field and a corresponding voltage are produced across the moving fluid in a direction determined by well known directional rules of electromagnetic induction. Such induced voltage appears across the aforementioned electrodes between which the fluid is channeled, and when a load circuit is connected across the electrodes current is generated and circulated through the completed circuit.

Further considerations provide an elaboration of MHD theory so that the generated voltage and other operational characteristics obtained from a given generating system can be predicted with a reasonable degree of certainty. For example, if ionized gas is used as the conductive working fluid, generated voltage and current are dependent upon physical parameters (including electric conductivity, temperature, pressure and velocity) of the gas (which can comprise combustion products as well as seed atoms or molecules of a low ionization potential element such as cesium or potassium) and the manner in which such parameters dynamically undergo change particularly as the gas flows through the generating duct arrangement. The magnetic flux field and the physical properties of structural materials such as magnetic permeability, electrical resistivity or conductivity and temperature-strength characteristics are also significant factors in voltage and current determination. More comprehensively, the operational nature of an MHD generating system is susceptible to mathematical analysis, and such analysis in terms of flow, electromagnetic and thermodynamic principles is available in recent research and patent literature, with reference particularly being given by way of example to a copending application Ser. No. 202,-714, entitled "Magnetohydrodynamic Generator Apparatus," filed by Stewart Way on June 15, 1962, now Patent No. 3,214,615, issued Oct. 26, 1965, and assigned to the present assignee.

Where combustion is employed to obtain the conductive working fluid or ionized gas, it is beneficial from an efficiency standpoint, as described in copending application Ser. No. 209,586, entitled "Magnetohydrodynamic Generator," filed by Richard L. Hundstad on July 13, 1962, now Patent No. 3,211,932, issued Oct. 12, 1965, and assigned to the present assignee, to provide reheat of the fluid in continuous or step form as the fluid flows along the generating duct. This is because fluid conductivity generally increases exponentially with increasing fluid temperature and reheat thus counters both temperature drop and conductivity drop along the duct length. Further, if reheat is provided by continued combustion in the duct itself, gains are obtained in conductivity beyond those attributable to increased temperature alone, since in the elements of duct volume or zones where combustion occurs a non-equilibrium ionization condition arises in which numerous electrons are set free as current carriers.

Although certain efficiency and other advantages can be gained by employing injection means to produce a non-homogeneous combustible mixture of fuel and oxidant in the duct volume, as described in copending application Ser. No. 326,611, entitled "Continuous Reheat Magnetohydrodynamic Generating Duct Arrangement," filed by Richard L. Hundstad on Nov. 27, 1963, and assigned to the present assignee, net gains in efficiency or advantage can also be obtained in some applications by employing injection means to produce a generally homogeneous combustible mixture of fuel and oxidant in the duct volume. The more efficient or advantageous of the two approaches would be determined and would vary from case to case according to design needs in a particular MHD system.

In accordance with the broad principles of the present invention, a continuous reheat generating duct for an MHD system comprises an elongated duct member with which there are associated suitable magnetic flux producing means and through which a conductive working fluid is suitably transported. Strut means are provided for injecting fuel or oxidant into the duct fluid so as to produce a generally homogeneous mixture of fuel and oxidant in the fluid along the duct length. Combustion is thus established along at least a substantial portion of the duct length, and the strut means are disposed adjacent an inlet end of the duct member and extended laterally thereacross substantially in alignment with the direction of the magnetic field so that end leakage current is substantially obstructed in the transverse interelectrode direction between spaced electrodes of the duct.

Accordingly, it is an object of the invention to provide a novel MHD generating duct arrangement wherein current is generated with higher density through continuous reheat of a working fluid transported through the duct.

Another object of the invention is to provide a novel MHD generating duct arrangement wherein continuous combustion is provided in a working fluid so that working fluid temperature and conductivity is maintained at a relatively high level along the duct length.

It is a further object of the invention to provide a novel MHD generating duct arrangement wherein power is generated with improved efficiency and spatial density as the result of conductivity gains obtained by combustion within the duct.

An additional object of the invention is to provide a novel MHD generating duct arrangement wherein power is generated with improved efficiency as the result of combustion within the duct and as a result of substantial blockage of end leakage currents between electrodes of the duct.

These and other objects of the invention will become more apparent upon consideration of the following detailed description along with the attached drawing, in which.

Figure 1:
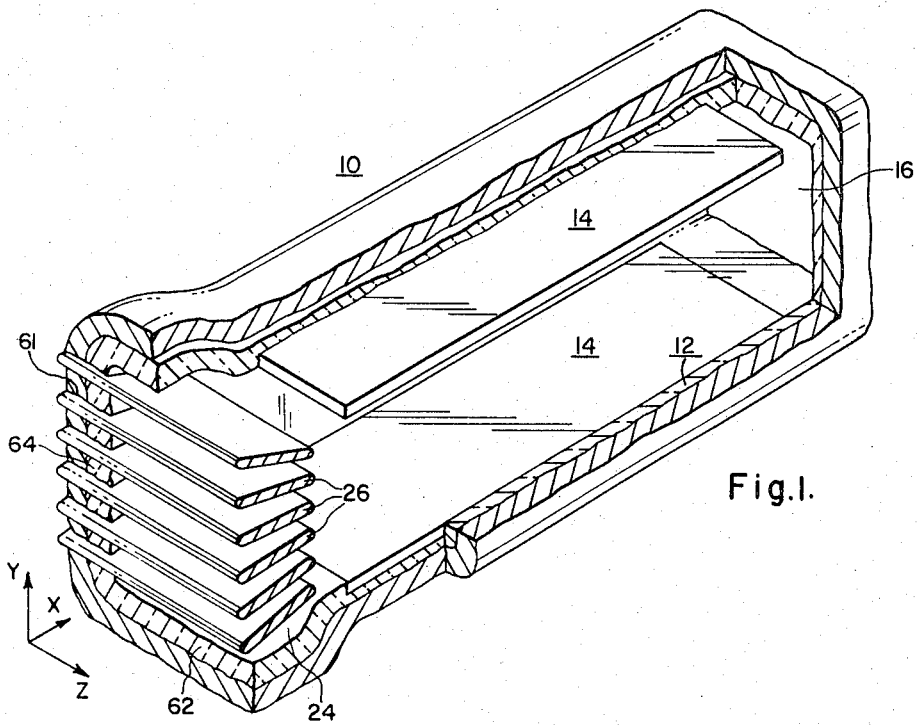
FIGURE 1 is a perspective view of a portion of an MHD continuous reheat generating duct arrangement constructed in accordance with the principles of the invention.

More specifically, there is shown in FIG. 1 an MHD generating duct arrangement 10 for which suitable magnetic flux producing means (not shown) are provided. For example, such flux producing means can comprise an elongated magnet disposed about the duct 10 and having magnetizing windings extending therealong as shown in copending application Ser. No. 317,671, filed on Oct. 21, 1963, by W. Brenner et al., now Patent No. 3,280,349, issued Oct. 18, 1966, and assigned to the present assignee.

Although MHD generating ducts can have annular or other shapes, as shown for example in copending application Ser. No. 318,260, filed by W. Brenner on Oct. 23, 1963, and assigned to the present assignee, the duct 10 is shown herein as being generally rectangular in cross section and comprises outer structural or metallic walls (not shown) which can be suitably cooled. Immediately within the outer duct walls there are provided insulative lining walls or a liner 12 which is preferably formed from a ceramic or high temperature insulative material such as zirconia.

The electrode means 14, formed from a material such as zirconium boride, are suitably supported on opposed outer walls of the duct 10 so as to face each other across fluid flow channel 16 which extends in the reference X direction. The interelectrode direction is thus disposed in the reference Y direction at right angles to the direction of fluid flow. Further, magnetic flux, as indicated by the reference character 18, is produced by the aforementioned flux producing means in the reference Z direction at right angles both to the direction of fluid flow and the interelectrode direction.

The electrode means 14 are continuous along the duct length as shown here, or they can comprise spaced electrode elements (not shown) distributed along the duct length. Suitable connections can be made from the electrode means 14 to external circuit terminals when current is generated during operation of the generating duct 10.

The working fluid or ionized gas comprises a primary fluid mixture including combustion products and an excess combustion agent suitably transported from the aforementioned combustion chamber to an inlet end portion 24 of the duct 10 with an inlet velocity and temperature suitable for power generation in the duct 10. In order to increase the power generating efficiency of the duct 10, combustion is continued along the duct length and for this purpose an additive combustion agent or component is injected into the flow stream by injector struts 26. The additive agent is a fuel such as acetylene or pulverized coal carried by air or combustion products if the inlet working fluid has excess oxygen as a combustion agent along with the primary combustion products, or it is an oxidant such as hot air if the inlet working fluid has excess fuel as a combustion agent.

Figure 2:
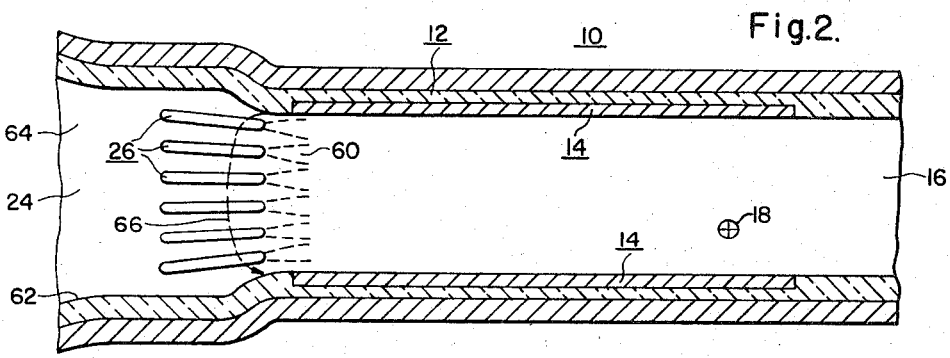
FIG. 2 shows a longitudinal section of the duct shown in FIG. 1.

In the embodiment shown in FIG. 2, the strut 26 comprises an inner metallic plate 28 having a coolant chamber 30 through which water or other fluid can be suitably circulated for cooling purposes. A ceramic wall 32 is disposed about the metallic plate 28, and the wall 32 can be formed for example from blocks 34 and 36 of heat resistant and electrically insulative material such as zirconia. Projections 38 on the metal plate 28 can be employed to captivate the blocks 34 and 36 relative to the plate 28.

Adjacent the downstream side of each strut 26 there is provided a manifold 40 which is preferably an integral part of the plate 28. Further, the manifold 40 preferably extends along substantially the full length of the strut 26 so that a combustion agent transported to chamber 42 therein is discharged generally uniformly across the duct channel 16 (in the reference Y direction) through one or preferably more elongated injection ports 44.

Figure 3:
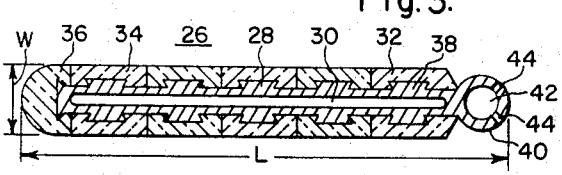
FIG. 3 shows a cross-section of an injector strut employed in the duct of FIG. 1.
Figure 4:
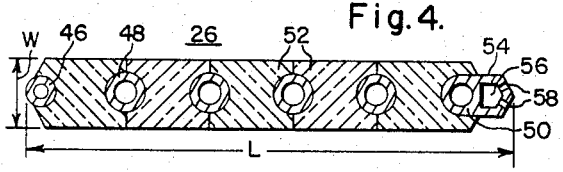
FIG. 4 shows a cross-section of another version of an injector strut that can be employed in the duct of FIG. 1.

In the embodiment of FIG. 4, the strut 26 comprises a plurality of metallic tubes 46, 48 and 50 through which water or other fluid is circulated for cooling purposes. A ceramic wall or ceramic blocks 52 are disposed about the coolant tubes 46, 48 and 50 to provide heat resistance and electrical insulation as in the case of the embodiment of FIG. 3. A manifold 54 is also provided adjacent the downstream end of the strut 26 of FIG. 4 and it is preferably provided as an integral part of the tube 50. A combustion agent transported to chamber 56 within the manifold 54 is thus discharged into the duct channel 16 through one or preferably more injection ports 58, and for injection uniformity it is preferable that the ports 58 and chamber 56 extend substantially the full length of the strut 26 of FIG. 4.

If it is assumed that the primary fluid stream includes in its mixture excess air or oxidant, fuel is fed into the strut chambers 42 or 56 and discharged into the duct channel 16 through discharge ports 44 or 58 so as to form a homogeneous or nearly homogeneous mixture of the fuel with the primary fluid. The fact that the discharge ports or injection ports 44 or 58 in each strut 26 are angularly disposed relative to each other aids in producing such a mixture. As the mixture of primary fluid and fuel flows downstream, combustion takes place substantially throughout the duct channel volume until the fuel or oxidant therein becomes exhausted by combustion during the downstream flow.

If the incoming primary fluid stream is rich in fuel instead of oxidant, then an oxidant such as hot air is fed into the strut chambers 42 or 56 and combustion occurs along the downstream or X direction in the duct channel 16 in a manner similar to that described where the injected combustion agent is fuel. In either event, improved conductivity is obtained in the duct channel 16 through the conductive fluid mixture by reason of the fluid temperature maintenance provided by the combustion as well as by reason of the fact that elements of volume where combustion occurs exhibit especially high conductivity as previously described.

The struts 26 are supported adjacent inlet end 60 of the duct 10 as indicated by the reference character 61 and are disposed in spaced generally parallel relation so as to extend in the reference Z direction between walls 62 and 64 of the duct 10. As previously noted, this is also the direction of the magnetic field 18. The spacing between the struts 26 is thus provided in the inter-electrode direction, and such spacing and the dimensioning of the struts 26 including their width W and their stream length L are arranged to produce a relative minimum amount of obstruction to fluid flow while achieving other objects such as generally uniform injection of the employed combustion agent.

If necessary, the outer struts 26 can be disposed somewhat angularly to minimize the flow obstruction and to obtain general injection uniformity, particularly if upstream channel 62 is provided with a greater cross-section than the duct channel 16. Since the struts 26 are extended in the direction of the magnetic field or transversely of the interelectrode direction, leakage paths such as path 66 between the electrode means 14 are interrupted and end leakage current is thus substantially impeded or eliminated. Significantly, such leakage currents tend to flow between the ends of the electrode means 14 in response to the generated voltage thereacross and thus produce an internal generator loss unless eliminated.

The operation of the generating duct 10 has been described in terms of a substantially homogeneous fluid mixture within the duct channel 16. Such homogeneity is preferred but not absolutely necessary in the use of the present invention. Thus, port means can be provided on the injector struts 26 or other similar leakage current blocking struts to produce a non-homogeneous pattern of combustion within the duct channel 16 wherein combustion zones would extend substantially continuously between the electrode means 14. The advantages and means for producing such interelectrode combustion zones are more fully described in the aforementioned copending application Ser. No. 326,611.

In summary, improved power generating performance or efficiency is provided by continuous reheat or combustion in the duct channel 16. Improvement is also obtained because of the reduction or elimination of end leakage currents between the electrode means 14 as provided by the positioning of the injector struts 26.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of a combustion agent, and a plurality of struts disposed adjacent the inlet end of said channel, said struts extending transversely of the channel and being relatively thin as compared to their length, the struts also extending for a substantial distance in the direction of said flow path and having means at their downstream edges for injecting another combustion agent into said primary fluid for combustion with the first mentioned combustion agent, said struts spaced from each other in the interelectrode direction and supported to extend entirely across said duct channel in the direction of said magnetic field to inject said other combustion agent uniformly across the entire width of the channel substantially in the direction of the axis of the channel.

2. A continuous reheat magnetohydrodynamic generating duct arrangement as set forth in claim 1, wherein each of said struts includes adjacent its downstream side a manifold extending along at least a substantial portion of its length and having at least a pair of injection ports disposed at an angle to each other so that said other combustion agent can be injected into said primary conductive fluid so as to form a generally homogeneous mixture therewith.

3. A continuous reheat magnetohydrodynamic generating duct arrangement as set forth in claim 1, wherein each of said struts comprises an elongated metallic plate member having a chamber therein for coolant circulation and further having thereon an outer lining of heat resistant and electrically insulative material, and a manifold projecting outwardly from said plate in the downstream direction for injecting said other combustion agent into said primary conductive fluid.

4. A continuous reheat magnetohydrodynamic generating duct arrangement as set forth in claim 1, wherein each of said struts comprises a plurality of tubular members spaced from each other in the fluid flow direction and disposed within heat resistant and electrically insulative lining material, the tubular member disposed furthest downstream having a manifold projecting outwardly therefrom for injection of said other combustion agent into said primary conductive fluid.

5. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of a combustion agent, and a plurality of elongated injector struts spaced from each other in the interelectrode direction and supported to extend entirely across said channel in the direction of said magnetic field, each of said struts being relatively thin as compared to its length and extending for a substantial distance in the direction of said flow path, each strut having a manifold adjacent its downstream side which has at least two injection ports disposed in angular relation to each other so that said other combustion agent can be mixed generally homogeneously with said primary conductive fluid for combustion along the length of said duct, at least the outermost strut members disposed in angular relation to the longitudinal center line of said duct so that the injection side thereof is disposed toward said longitudinal center line.

References Cited
UNITED STATES PATENTS

| | | | |
|---|---|---|---|
| 1,196,511 | 8/1916 | Borger | 310—11 |
| 3,210,576 | 10/1965 | Brogan | 310—11 |
| 3,303,363 | 2/1967 | Louis | 310—11 |

MILTON O. HIRSHFIELD, *Primary Examiner.*

D. X. SLINEY, *Assistant Examiner.*